(12) United States Patent
Boler

(10) Patent No.: US 9,147,350 B2
(45) Date of Patent: Sep. 29, 2015

(54) STUDENT PERFORMANCE MONITORING SYSTEM AND METHOD

(76) Inventor: John Leon Boler, St. Paul, MN (US)

(*) Notice: Subject to any disclaimer, the term of this patent is extended or adjusted under 35 U.S.C. 154(b) by 0 days.

(21) Appl. No.: 13/275,278

(22) Filed: Oct. 17, 2011

(65) Prior Publication Data

US 2012/0094265 A1    Apr. 19, 2012

Related U.S. Application Data

(60) Provisional application No. 61/393,435, filed on Oct. 15, 2010.

(51) Int. Cl.
  *G09B 3/00* (2006.01)
  *G09B 7/00* (2006.01)
  *G09B 5/00* (2006.01)

(52) U.S. Cl.
  CPC ... *G09B 7/00* (2013.01); *G09B 5/00* (2013.01)

(58) Field of Classification Search
  CPC .............. G09B 5/00; G09B 5/08; G09B 5/14
  USPC ................. 434/236, 350, 362, 322, 323, 365; 462/22; 463/22
  See application file for complete search history.

(56) References Cited

U.S. PATENT DOCUMENTS

| | | | | |
|---|---|---|---|---|
| 4,375,080 A | * | 2/1983 | Barry et al. | 434/238 |
| 5,294,229 A | * | 3/1994 | Hartzell et al. | 434/336 |
| 5,863,207 A | * | 1/1999 | Powell | 434/352 |
| 6,652,287 B1 | * | 11/2003 | Strub et al. | 434/365 |
| 7,191,095 B2 | * | 3/2007 | Dries | 702/182 |
| 8,182,267 B2 | * | 5/2012 | Katz et al. | 434/236 |
| 8,472,862 B2 | * | 6/2013 | Yaskin et al. | 434/362 |
| 2002/0094513 A1 | * | 7/2002 | Weir et al. | 434/350 |
| 2003/0207242 A1 | * | 11/2003 | Balasubramanian et al. | 434/322 |
| 2004/0063086 A1 | * | 4/2004 | Yang et al. | 434/350 |
| 2006/0035205 A1 | * | 2/2006 | Dobson et al. | 434/350 |
| 2006/0057550 A1 | * | 3/2006 | Sahashi | 434/350 |
| 2007/0048705 A1 | * | 3/2007 | Belter | 434/236 |
| 2008/0026356 A1 | * | 1/2008 | Kagan | 434/322 |
| 2008/0177504 A1 | * | 7/2008 | Niblock | 702/182 |
| 2008/0280279 A1 | * | 11/2008 | Jang et al. | 434/308 |
| 2010/0221693 A1 | * | 9/2010 | Gupta | 434/362 |

* cited by examiner

*Primary Examiner* — Peter Egloff
(74) *Attorney, Agent, or Firm* — Skaar Ulbrich Macari, P.A.

(57) ABSTRACT

Disclosed is a student performance monitoring system and method. In certain embodiments, a software program can be stored on a computer readable medium, executed by a computer and interacted with by a user, such as a teacher. The device, system and method include selecting students, scoring them and recording their effort in categories relevant to student learning. The student scores can also be used to generate reports and select students for recognition awards. In one example, a handheld computing device, such as a smart phone can be conveniently utilized. However, other computing devices may also be used instead of or in addition to those described herein. Other embodiments include a method and a system for monitoring student performance. The system and method can also be accessed by teachers, students and parents through an internet portal. The program can be configured as a web application.

4 Claims, 11 Drawing Sheets

| Overview | Titled Events | Effort Awards | Effort Achievers | Scores by Date |
|---|---|---|---|---|

P0 Demo, 1: Titled scoring events

| Count | Name | Club EcoRpts 2x | Notes 5/17 1x | Trophic Level WS 2x |
|---|---|---|---|---|
| 1 | Beverlin, Dan | 9.5 | 9.0 | 9.5 |
| 2 | Buckmaster, Bruce | 9.0 | 9.5 | 8.5 |
| 3 | Currington, Katy | 7.5 | 8.5 | 8.5 |
| 4 | Delmont, Ted | 9.5 | 9.5 | 8.5 |

FIG. 15

Effort Tracker

Classes | Data Reports | Setup | My account | Sign out

Class Report
P9 Demo

| Overview | Titled Events | Effort Awards | Effort Achievers | Scores by Date |
|---|---|---|---|---|

| Count | Name | EA's Awarded | EA's Possible | Bonus |
|---|---|---|---|---|
| 1 | Beverlin, Dan | 3 | 6 | 3 |
| 2 | Currington Katy | 5 | 5 | 5 |
| 3 | Crrington, Katy | 4 | 5 | 4 |
| 4 | Delmont, Ted | 5 | 5 | 5 |

STUDENT PERFORMANCE MONITORING SYSTEM AND METHOD

PRIORITY

This application claims the benefit of priority based on U.S. Provisional Application Ser. No. 61/393,435, filed on Oct. 15, 2010, the entirety of which is hereby incorporated herein by reference.

FIELD

The present invention relates to computer executable software, computing apparatus, methods and systems for monitoring student effort and performance. More particularly, the system, method, systems and apparatus provide for student selection, scoring, effort monitoring and overall performance monitoring.

BACKGROUND

There are many grading systems in use for scoring student performance. One common method in the U.S. is to assign a letter grade or corresponding numerical value (e.g. 4-point and 16 point scales). However, these systems only convey a raw outcome score for the student performance. These systems do not report the level of effort or participation that a given student exhibits. Thus, parents or guardians of a student often do not know why their student may be performing poorly or exceptionally in certain areas, subjects, or classes.

It is also difficult for teachers to maintain detailed notes or records to identify reasons for weakness in a given student's performance. It is further a difficulty to require approximately equal distribution of participation in classroom activities for all students.

Therefore, there is a need to provide an improved student performance tracking or monitoring system and method.

SUMMARY

The student performance monitoring system and method disclosed herein addresses the previously noted difficulties and deficiencies present using conventional student grading systems and methods. In particular, the present disclosure provides a software program that can be stored on a computer readable medium, executed by a computer and interacted with by a user, such as a teacher. In one example, a handheld computing device, such as a smart phone can be conveniently utilized. However, other computing devices may also be used instead of or in addition to those described herein. Another embodiment disclosed herein is a computer, such as a smart phone, having some or all of the functionality described herein. Other embodiments include a method and a system for monitoring student performance, and a recognition system executing software configured to identify students who exhibit an effort level that is consistently high. The system and method can also be accessed by teachers, students and parents through an internet portal. The program can be configured as a web application.

In one aspect, the invention may comprise a student effort tracking system. The system may include a database computer located in a first location including an executable software program stored on a recordable media. The system may also include a user computing device located in a second location remote from the database computer. The user computing device can include a graphical user interface and a data input device. The user computing device is in communication with the database computer via the internet. The software program executing on the database computer is configured to randomize a list of students in a class, transmit over the internet to the user computing device an identity of a particular student to be evaluated for effort, receive an effort score entered into the computing device for the particular student, and store the effort score for the particular student on the recordable media.

Another aspect of the invention may comprise a method of scoring effort. The method includes displaying on a graphical user interface the name of an individual student selected from a randomized list of students in a class. It also includes displaying on the graphical user interface a plurality of effort scoring tiles. One of the plurality of scoring tiles to designate an effort score for the individual student can be selected. The effort score can be stored in a database. Also, the name of a subsequent individual student selected from the randomized list of students in the class can be displaying on the graphical user interface.

Yet another aspect of the invention may comprise an effort scoring system. The system can include a web application comprising software code stored on tangible media and executing on a first internet-connected computer. It can also include a user interactive computer comprising a graphical user interface and data input device. The user-interactive computer being is connected to the internet and is configured to receive data from the first internet-connected computer. The data can include an identity of a particular student to be evaluated for effort, a current category in which effort is to be evaluated, and a plurality of effort score options selectable by an evaluator. The user-interactive computer can be configured to display on the graphical user interface the identity of the particular student to be evaluated for effort, the current category in which effort is to be evaluated, and the plurality of effort score options. Also, the user-interactive computer can be configured to register a selection by the evaluator of one of the plurality of effort score options with the input device and transmit the selection information to the first internet-connected computer.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 5 is an example graphic interface screen illustrating certain aspects of certain embodiments of the invention.

FIG. 6 is an example graphic interface screen illustrating certain aspects of certain embodiments of the invention.

FIG. 13 is an example graphic interface screen illustrating certain aspects of certain embodiments of the invention.

FIG. 14 is an example data reports screen illustrating certain aspects of certain embodiments of the invention.

FIG. 15 is an example graphic interface screen illustrating certain aspects of certain embodiments of the invention.

FIG. 16 is an example data reports screen illustrating certain aspects of certain embodiments of the invention.

FIG. 17 is an example graphic interface screen illustrating certain aspects of certain embodiments of the invention.

FIG. 18 is an example graphic interface screen illustrating certain aspects of certain embodiments of the invention.

Figure 1:
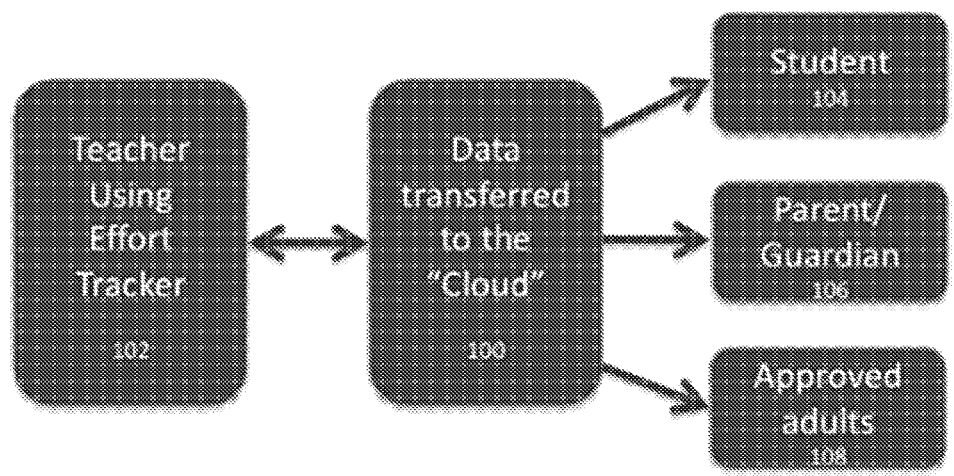
FIG. 1 is a general system diagram according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention.

Effort is distinct from performance. Performance is a graded result, such as a test score or a grade given to a student's paper. In contrast, effort is referencing the student's level of focus, attention, concentration or completion of a question, reading, problem, idea, viewpoint, graph, table, or any defined learning event. Effort thus reflects how the student applied himself or herself in achieving a particular task.

Effort quantification can be particularly useful to a teacher. For example, a teacher may individualize scoring by considering (applied effort)÷(capable effort). Under this consideration a low achieving student may be scored similarly to a high achieving student. Thus the correlation between effort and performance achievement reveals whether the student is maximizing his or her potential when reaching a particular level of achievement. Effort levels can also be predictive of future performance. Students in need of extra motivation or attention can be identified well before achievement scoring would reveal such student. Thus effort considerations allow a teacher to be more proactive in meeting their students learning needs.

Effort quantification can also be of great interest and use to the student's parents/guardians, to administrators and to counselors. For example, effort trends and effort-achievement correlations based upon quantified effort data can be useful to monitor the student's progress on a more granular scale than merely receiving grade and test results. This allows parents to closely follow their student's progress in school and for administrators and counselors to diagnose issues and recommend solutions for a given student.

In certain embodiments, the invention comprises software code stored on a tangible medium such as flash memory, a hard-drive, disk drive, removable memory or an equivalent thereto. The tangible medium interacts with a processor that interfaces with a graphical user interface and an input device. For example, the invention is an application executing on a general-purpose computer. In another example, the invention is an application executing on a portable computing device such as a smart phone, tablet computer or a laptop computer. All of these examples have a screen as a graphical user interface. The smart phone and tablet may also use the screen as the data input device. Alternatively, a keyboard, mouse or other data input means may be utilized without departing from the scope of the invention.

In other various embodiments, the invention comprises a so-called web-based application executing on an internet-accessible computing device located remote from the user. The user uses a computing device such as that described in the preceding paragraph to interact via the internet with the remote computing device that executes the application. For example, the software is stored and executes on a computer located in a data center that is internet connected. The user uses a smart phone, tablet computer or other computer to log into the remote computer via a website portal or application. The user enters data or other inputs through the input device (s) of the smart phone, tablet computer or other computer, which is then processed by the remote computer and the output is then presented to the user's computer or smart phone screen.

Various aspects, features, functions and advantages of various embodiments of the invention will now be discussed.

One feature of certain embodiments of the invention is to provide for a system, method and apparatus for teachers to randomly select students for a variety of purposes. Randomization of student selection eliminates conscious and subconscious imbalance in selecting students for purposes such as class participation that may be scored for effort. Following an established pattern, such as alphabetical by last name also causes anomalies in effort scoring because a student can predict the timing of his or her evaluation and appear prepared at the time of evaluation, while not otherwise being prepared. Thus the student's true effort level is not necessarily accurate. Randomization of student selection therefore minimizes imbalances that may compromise accurate effort evaluations In another aspect of the invention, student effort can be evaluated in four categories: (1) transitions (attentiveness when transitioning to new learning tasks—also referred to as "Ready?"); (2) on-task (effort during individual or group learning events; (3) questions (effort toward answering content based questions); and (4) readers (reads when chosen or demonstrates that they have been following along). More or fewer categories are within the scope of the invention. Also, different categories than the preceding can be utilized without departing from the scope of the invention.

Effort points in the various categories are scored using the tracking system. The effort tracking system can be either a stand-alone system, or can be incorporated into the teacher's overall grading system. The effort data can also be used for a variety of additional or alternative purposes, including tracking differences between boys and girls, racial groups classes and effort of individual students over a given time period. The data may help teachers assess the success of their efforts to close achievement gaps based on gender, ethnicity, overall classes and to spot trends in individual students.

Various embodiments of the invention can provide one or more of the following advantages: (1) improves the accuracy and efficiency of the teacher's grading system; (2) eliminates teacher patterns of choosing students who often or willingly participate; (3) improves teacher assessment when checking for class understanding; (4) eliminates real or imagined biases in selecting students based on gender or race; (5) increases participation from timid or reluctant students (energizes and equalizes student participation); (6) scores effort and class work in real-time, reducing teacher workload; (7) increases student accountability by easily scoring learning tasks; (8) recognizes and rewards strong and consistent student effort; and (9) provides students and parents access to scores that are updated in real-time.

In another aspect of the invention, the system is implemented as a web-based application or cloud-application. This configuration advantageously permits teachers to log-in and manage program options and view data reports for classes and individuals from any web-accessible computing device versus only being able to interact with the system when using the particular computer on which the executable software is stored. Additionally, students and parents/guardians can log-in from any web-accessible computing device to view their effort scores in various categories as well as view effort trend graphs. Such web-based applications allow each of these groups to access their data without needing to access other systems, such as the school's or the district's computer systems, which may present a security risk and also increases administrative and cost burdens on the school and district that may preclude or slow the adoption of the invention.

Referring to FIG. 1, a general system accessibility diagram is shown according to an embodiment of the invention. The program is stored or hosted on a server computer located in a remote computing site, such as a data center, that is connected to and can be accessed remotely through the internet using various means, such as an HTML5-based web interface (or equivalent) or by an application loaded on the user's smart phone, tablet computer or other computer. This can be referred to as a cloud-based or web-based application. The system data is stored on the remote server computer's storage medium (cloud 100) and is remotely accessible by a variety of individuals. The teacher 102 using the system has two-way interactivity with the cloud 100. For example, the teacher can enter student effort scores by way of a hand-held computing device, such as a smart phone, that is in communication with the data cloud by way of the internet. The application executing on the remote server in the data center can interact with the teacher's smart phone by, among many things, indicating the students in the class under evaluation and also indicate the randomly-selected student that the teacher should call on next.

Students 104 can be provided with limited access to the data cloud, such as viewing-only. The student's user name or password can be restricted to access only the data for that particular student in order to protect privacy. The student can also thus be prevented from editing the data in the database. The student is able to review his or her effort scores as soon as they are entered by the teacher (i.e, in real time), so that the student can be proactive in addressing his or her efforts before testing may reveal a deficiency.

Parents or guardians 106 can also be provided with limited access to the database as described above. Thus, the parents or guardians can, if they desire, have access to a far more granular data to track their respective student's progress and effort levels. The trends that such frequent data provides can be predictive to the parent or guardian of the expected testing performance that the student will achieve. The degree correlation of the students effort scores with his or her testing performance can reveal if the student is being adequately challenged and if he or she is achieving at a level commensurate with ability.

Sometimes communication between parents or guardians regarding student's school performance can be challenging, such as if the parents are divorced and the student only lives with one parent. This difficulty can be addressed by providing each of the designated parents or guardians with viewing access to their student's data.

Additionally, this system greatly enhances communication from teacher to parents/guardians and qualified school professionals. By using the described effort monitoring system with real-time scoring, the teacher communicates such information as: is the student prepared for class, is the student engaged in class, does the student participate, does the student comply with class rules and expectations, etc. The user could send, for example, upwards of fifty communications of this type per class (33 students—scored on-average 1.5 times each across five categories).

Approved adults 108 can also be provided with varying selectable access level to the database. For example, a school principal, guidance counselors, and members of certain governmental school monitoring agencies may have legitimate reasons to access effort data for individuals or groups of students. The groups can include individual classes, grades or entire schools, a combination thereof, or another custom grouping of data. The aggregate or individual data points can be graphed and compared for trends and against pre-defined metrics and used for a variety of evaluation purposes as is understood by persons of ordinary skill in the art. As mentioned above, this effort data also can be helpful toward understanding and closing achievement gaps between ethnic groups.

Figure 2:
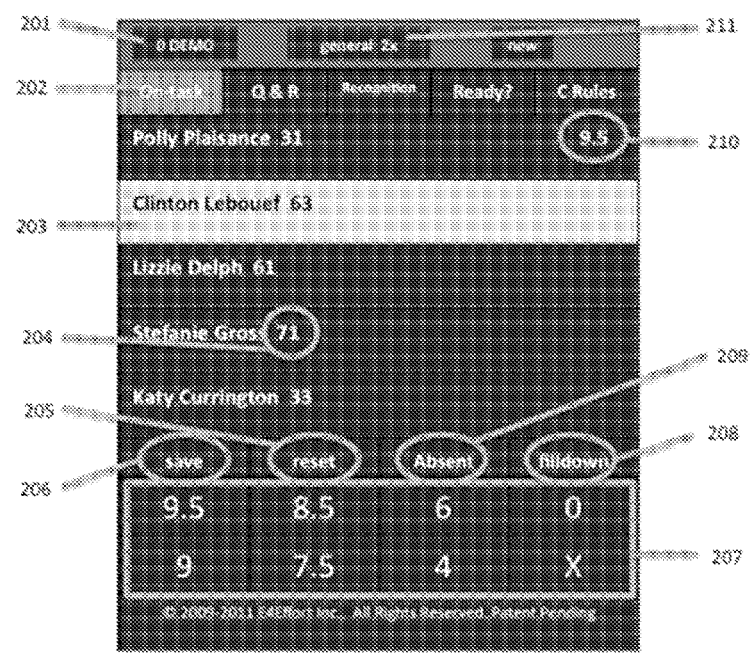
FIG. 2 is an example graphic interface screen illustrating certain aspects of certain embodiments of the invention.

Next, the interfaces and operation of various aspects of the system, method and apparatus will be explained. Referring to FIG. 2, an example of the interface of the remote device is shown. The remote device can take many forms, including a tablet computer or a smart phone, that are configured to receive data input from the user, such as the teacher, and transmit that data to the remote-hosted application and database. Also, the remote device receives data from the remote-hosted application and presents that data graphically and textually to the user. Thus, the remote device is in two-way communication with the remote-hosted application and the database.

An example of the graphic interface displayable on the teacher's smart phone is depicted in FIG. 2. The display includes a list of the current class/subject 201 under evaluation. The teacher touches this button (here by tapping the screen, but a physical button may be provided in alternative embodiments) to view and select that teacher's list of classes/subjects. A row of selectable category choice buttons 202 is provided. "On Task" is currently selected here. A particular student is highlighted 203. The highlighter shows the teacher whose turn it is to be scored. The highlighted student 203 has been randomly ordered in the class list of students. The teacher makes a scoring selection from the scorepad 207. Numbers after student names 204 represent their assigned seat (e.g., group 6 seat 3). Pressing the reset button 205 will produce a new random list of all students in the current class.

When the teacher is done scoring the students, the save button 206 is touched to send the data from the handheld device to the database in the "cloud". Alternatively each score can be instantly transmitted to the database upon entry. The scorepad 207 indicates the available scoring options. Scores of previously-scored students appears on the right side (see 210) of the screen and after scoring, the next student of the randomized list is highlighted.

Scorepad options can be changed by accessing Setup/Settings/Scorepad values. The filldown button 208 will give the previous score to the remaining unscored students. The absent button 209 permits tracking of how often students are absent when their turn occurs. As noted above, pending or saved scores 210 are shown on the screen. To change a score before saving, touch the student's name and the highlighter will relocate to that student. The settings button 211 reveals current settings (general 2x). User options allowed by the settings button will be described later in the discussion of the category On Task.

Figure 3:
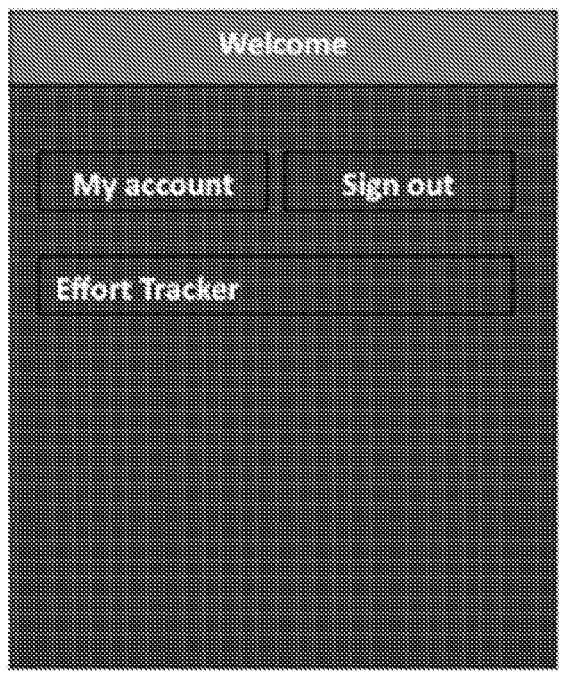
FIG. 3 is an example graphic interface screen illustrating certain aspects of certain embodiments of the invention.
Figure 4:
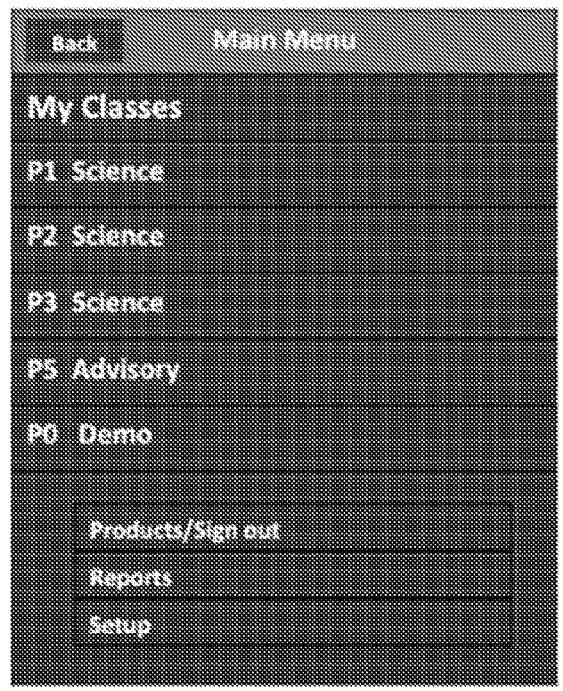
FIG. 4 is an example graphic interface screen illustrating certain aspects of certain embodiments of the invention.

In use, the teacher accesses the web-portal for the web-based application and is presented with a welcome screen such as is shown in FIG. 3. Once the log-in credentials are entered and verified by the remote-hosted application, the teacher is presented with the main menu screen shown in FIG. 4. This menu screen lists the teacher's classes along with Sign out, Reports, and Setup options. The teacher then chooses a class to get started (or the Demo class to practice). Alternatively, the teacher can use a laptop or desktop computer to score students, view or change data or make changes under Setup options.

Once the teacher has registered a user name and password, and paid the registration fee, if applicable, the setup process generally comprises a) naming the first Time period, b) entering classes or subjects, and c) entering students and assign them to one or more classes or subjects. Then the teacher's list of classes or subjects will appear on the graphical user interface. Then the teacher selects a class or subject and a screen similar to FIG. 2 will be presented.

The system can comprise one or more categories for scoring student effort or class work and one for recognizing student performance. Four exemplary categories will be described in this specification. However, it is understood that more or fewer categories are within the scope of the invention, as well as alternative categories are within the scope of the invention.

The Q&R (Questions and Readers) category is used to equalize student participation opportunities. It is configured to facilitate a teacher randomly calling on students in class to check their understanding of content, or to read aloud, or to state their opinion. The system randomly orders the students in the class. This random order will hold until all students have had a turn regardless of whether the teacher exits to another category or class. When the student whose name is listed last is scored and their score is saved, a new random order will be generated. If at any time the teacher wishes to generate a new random listing of students, the teacher may do so by pressing the reset button 205.

The scorepad 207 at the bottom of the teacher's display includes a plurality of buttons (e.g., 9.5, 9, 8.5, 7.5, 6, etc.) for scoring student effort. (Available score value buttons can be adjusted by going to: Setup/Settings/Scorepad values.) Scores can be based on a 10-point system, letter system or other scoring scale. In the 10-point embodiment, scoring student effort or class work at 9.5 is 95%, 8.5 is 85%, etc. as assessed by the teacher using the effort metric: (applied effort)÷(capable effort). The teacher calls the student name that is highlighted and taps the appropriate button on the scorepad 207 to score the student. The save button can be highlighted, such as turning red when there is data to save. Pressing the save button sends student scores to the remote-hosted database where the data is organized by class, student, category, and in some cases, Title.

Figures 5, 6:
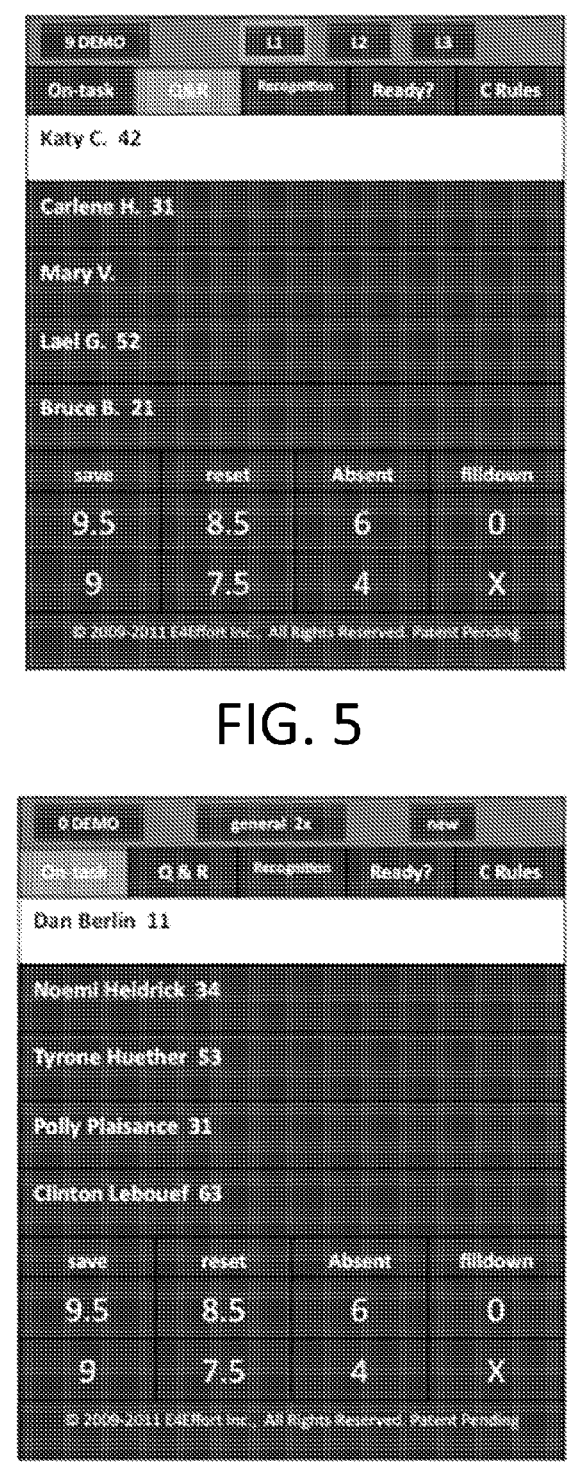

The Q & R category can also allow for multiple question Levels. This will be discussed with respect to three levels, but more or fewer levels are within the scope of the invention. To change question levels, the teacher selects one of the three buttons located along the top bar of the Q&R category (e.g., L1, L2 or L3) as shown in FIG. 5. Each question level can have its own randomized student order. To encourage students to respond to higher-level questioning, scorepad values are set higher for Levels 2 and 3 or can received a progressively increasing weighting of the particular effort score with respect to lower levels.

In one example embodiment, Level 1 corresponds with questions associated with content that has been previously covered and involves recalling information. Level 2 corresponds with questions are those that use higher-level thinking involving understanding. For questions at this level the student shows an understanding of the content material beyond recalling facts. Level 3 corresponds with questions are also higher-level questions involving application, analysis, synthesis, or evaluation. For example, where did the energy that is contained in a hamburger come from? What can you infer or predict from the trend shown in this graph?

In certain embodiments, perfect effort scores are not made possible or are only possible in certain categories (e.g. On-Task). Instead students may boost their overall percentage by a certain percentage, such as 10%, through a recognition-bonus sub-system (explained below). However, perfect scores options can be used without departing from the scope of the invention. Also the scoring values and descriptions system can be varied from those described herein without departing from the scope of the invention.

Example scoring for level 1 questions:
9.5 The student answers the question correctly
9 The student's answer is very close to the correct answer or the student states the question correctly and later answers correctly when given a second opportunity.
8.5 The student's (applied effort)÷(capable effort) is judged to be at or near 85%. (Score a 7.5 for 75% effort metric, 6.0 for 60%, etc.)
4 The student's response is unrelated to the question or the student cannot answer or repeat the question in a timely manner.
0 The student has been inattentive and disruptive to the class or to nearby students.
X Use to skip the student for whatever reason (if the student is absent, use the absent button or don't score at all).

The default highest scorepad value for Level 2 and Level 3 questions can be set to 10.5. Thus an extra-credit incentive exists for students to participate in higher-level questioning. Students making a genuine effort to answer a higher-level question can be scored mostly high, such as a 9.5. The "X" (skip) can be used for a student who is not able to respond to a higher-level question. This does not raise or lower their overall effort score but will remove them from the queue. The premise is to give multiple students higher-level questions— one chance and move on—don't focus on one student too long.

Example scoring for level 2 and 3 questions:
10.5 The student answers the question correctly
10 The student's answer is very close to the correct answer or the answer is correct after a hint is given
9.5 The student's answer is very close after a hint is given
4-6 The student is off task—cannot repeat the question 0 The student has been inattentive and disruptive to the class or to nearby students.

X Use to skip student's turn without benefit or penalty. It's much more common to use the X while in Question Level 2 or 3 to allow other students an opportunity at higher-level questioning.

Students that were not scored when their name is highlighted rise to the top of the selection list after scores are saved.

Example scoring for Q & R: Readers category 9.5 The student begins reading right after their name is called and/or answers a content question (taken from the section just read) correctly.

8.5 There is a slight delay by the student after their name is called or their answer to the content question is slightly incorrect or incomplete.

7 The student claims to have momentarily lost track of where the previous reader left off and you believe this to be accurate.

0-4 The student does not know the reading location and has been disruptive to the class or to nearby students.

X Use to skip the student for whatever reason (if the student is absent, use the absent button or don't score at all)

Figure 7:
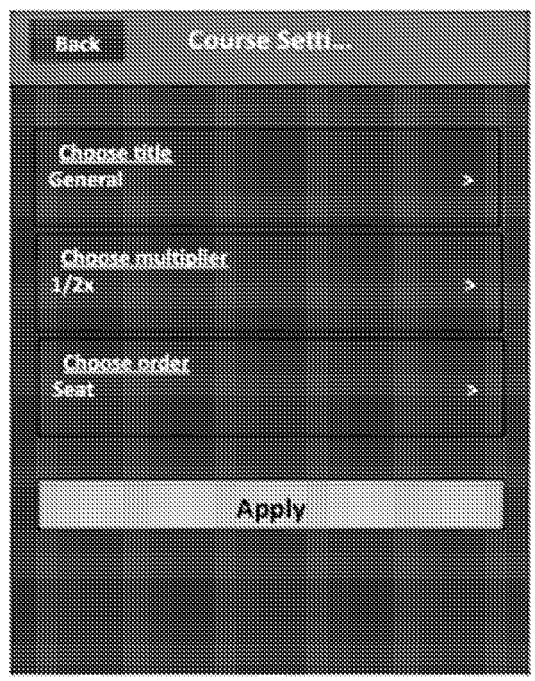
FIG. 7 is an example graphic interface screen illustrating certain aspects of certain embodiments of the invention.

Another aspect of the invention is the On Task category. The features of this aspect can reduce a teacher's correcting workload, increase student accountability, and aid in overall class management. Referring to FIG. 6, the settings button (located on top bar where it reads "general 2x") for On Task calls up a settings menu to permit the user to adjust various aspects of the parameters of the On Task category as shown in FIG. 7. Parameters such as: a) Titling the learning event or classifying the learning event as general, b) raising or lowering the normal 10-point scoring scale, and c) listing student names in an ordered or random mode. Additional or fewer parameters can be provided without departing from the scope of the invention.

Figure 8:
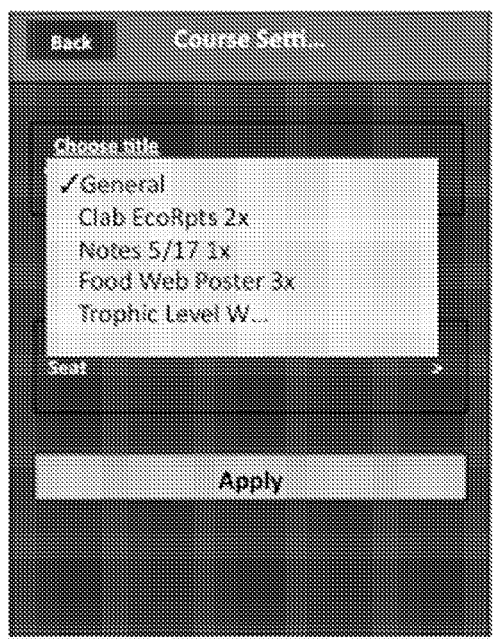
FIG. 8 is an example graphic interface screen illustrating certain aspects of certain embodiments of the invention.

Example Title setting options are shown in FIG. 8. Under the "Choose title option in FIG. 8, the user may Title a learning event or designate it as "general". Titled events are organized and displayed in their own table within the Data Reports section of the system. Whether On Task scores are given a Title or classified as general, the data becomes part of the student's On Task percentage. Teachers may choose to assign a Title to a learning activity when they plan to score all students and want to be able to trace On Task scoring to a particular learning event or activity.

Figures 9, 10:
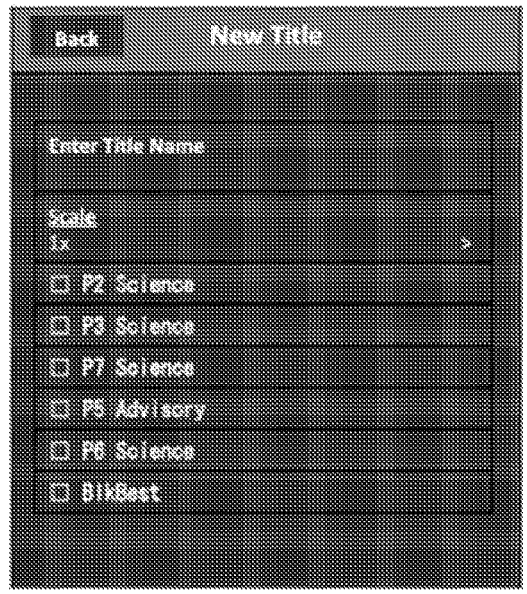
FIG. 9 is an example graphic interface screen illustrating certain aspects of certain embodiments of the invention.
FIG. 10 is an example graphic interface screen illustrating certain aspects of certain embodiments of the invention.

To create a new title, while in the On Task category select "new" from the top bar (FIG. 6) This can be done from a handheld device such as smart phone or tablet, or from the Setup menu when using a laptop, or desktop computer. A new screen will appear as shown in FIG. 9, that allows the user to: 1) type in the title, 2) choose the score multiplier (The 10-point scoring scale can be raised or lowered to more closely match the time or effort required of a learning task), and 3) assign the Title to one or more classes/subjects.

Scores in each of the Effort Categories can be based on a 10-point system as discussed previously. In the categories: On Task, Ready? and U choose, the user has the option of raising or lowering the value of a scoring event by using a multiplier such as ¼, ½, 2, 3, 4, or 5. Multiplying the 10-point system (or other scoring system) by each multiplier gives an increased possible point range, such as from 2.5 to 50 in the case of a 10-point scale. For example, setting the multiplier at 3× and giving a student a score of 7.5 will register in Data Reports as a score of 22.5 out of 30 (7.5×3=22.5 and 10×3=30). Thus, weighting one Effort Category higher or lower than another is permitted.

Referring to FIG. 7, pressing the "choose order" button will allow the user options for displaying student names in an ordered or random mode. The choices after pressing the "Choose order" button are: (1) By Assigned Seat Location, (2) Alphabetical by Last or First name, and (3) Random. Randomizing the selection of students that the teacher will evaluate and score helps to assure that all students (eventually) receive individual attention from the teacher.

Ready? (Transitions) is a category that can be chosen at the start of class to score the following start-class expectations, such as whether the student: (1) is at assigned seat, (2) is not talking, (3) has notebook and other materials out, (4) has a writing utensil, (5) is reading the daily agenda, learning goal, or has started "bell work". The teacher may choose to spend 10 to 30 seconds scoring 3-7 students as the class quiets down, usually without announcing student names as they are scored. The Ready? category can also be used when transitioning from one learning task to another or when pulling the group back from an activity to give further clarification.

Additional custom categories set up by the teacher can also be selected and scored as desired. The additional categories are shown as selectable tabs on the bar along with the categories discussed above. For example, in FIG. 10, the category "C Rules" has been set up by the user. "C Rules" is shorthand for "class rule" and is handy for scoring students on how well they follow class rules. Other example custom categories can include: HmWrk (Homework check), Debates, and Helpers (Help with classroom cleanup, demonstrations, or a messenger to the office).

Figures 11, 12:
FIG. 11 is an example graphic interface screen illustrating certain aspects of certain embodiments of the invention.
FIG. 12 is an example graphic interface screen illustrating certain aspects of certain embodiments of the invention.

Another aspect of certain embodiments of the invention is a recognition mechanism. With the recognition feature, students receive bonus points for having consistently high effort metrics ((applied effort)÷(capable effort)) and complying with class rules and procedures. Students may obtain bonus points in two ways: by earning Effort Awards, and by being an Effort Achiever. Effort Awards are based on the student's previous five scores, whereas Effort Achiever is based upon averages all of the student's scores during the current Time Period. In other words it is an honor roll for effort. Bonus points can be automatically calculated and displayed in several locations in data reports and also on the student's web-accessible page. FIG. 11 shows a screen image of the Recognition category that is used to assess Effort Awards. Eligibility for an Effort Award can be set to a predetermined parameter, such as the average of the student's most recent five scores (shown as a percentage in FIG. 11) must greater than or equal to 87% and the student must have complied with all class rules and procedures during that period. Categories of effort achievement can also be set to recognize students reaching certain ranges of effort.

Another aspect of certain embodiments of the invention is a variety of data reports for reviewing and analyzing the student effort data maintained in the database. Data reports can be best viewed on a screen, such as a tablet, laptop or desktop computer. After selecting the Data Reports tab, the user chooses a class or subject listed under "Select a class" in FIG. 12. Once the user does this, the Data Reports screen (FIG. 13) will appear. Data Reports has five tabs to choose from: Overview, Titled Events, Effort Awards, Effort Achievers, and Scores by Date. However more or fewer tabs can be provided without departing from the scope of the invention.

Now the use of the Overview Tab and Entering data into a grade book will be discussed. The effort database data can be inputted into the teacher's grade book in a variety of ways. The teacher can manually enter the effort score in a paper grade book. For electronic grade books, the teacher can also perform manual entry of effort scores. Alternatively, an additional aspect of certain embodiments of the system is to automatically sync the effort score with the teacher's electronic grade book system. In a further alternative, the invention comprises an integrated electronic grade book that maintains record of all effort and performance grades that the teacher may desire to track in the overall grading process.

In the synced embodiment, a parent, student, teacher or other authorized person checks the grade book portal and sees an effort percentage that is up-to-date. That person can click on the effort percentage (since it can be a live web link) and arrive at the student's effort report showing the scores that were entered using the effort tracking system. Alternatively, a second viewing window can open to present the effort data or an effort data report (see sample report shown in FIG. 14). In a further alternative, a mouse-over window appears when the cursor in the grade book screen is placed over the effort score and the effort data or effort data report is presented.

In another alternative, the effort database application includes a portal to the electronic grade book so that the viewer can seamlessly switch between each. The syncing is performed preferably in real time so that an update to the effort data automatically and immediately updates the electronic grade book.

In embodiments where the effort tracking system is maintained on an internet-connected database computer, students and parents can access the effort data in real-time. For example, students and parents will be able to visit the student's access page to view the student's real-time effort scores as frequently as the teacher uploads the scores. Whenever the teacher user saves data from an effort category, the scores are instantly sent to the database where the new data is combined with previous data to compute updated by-category and overall percentages.

Figures 13, 14:
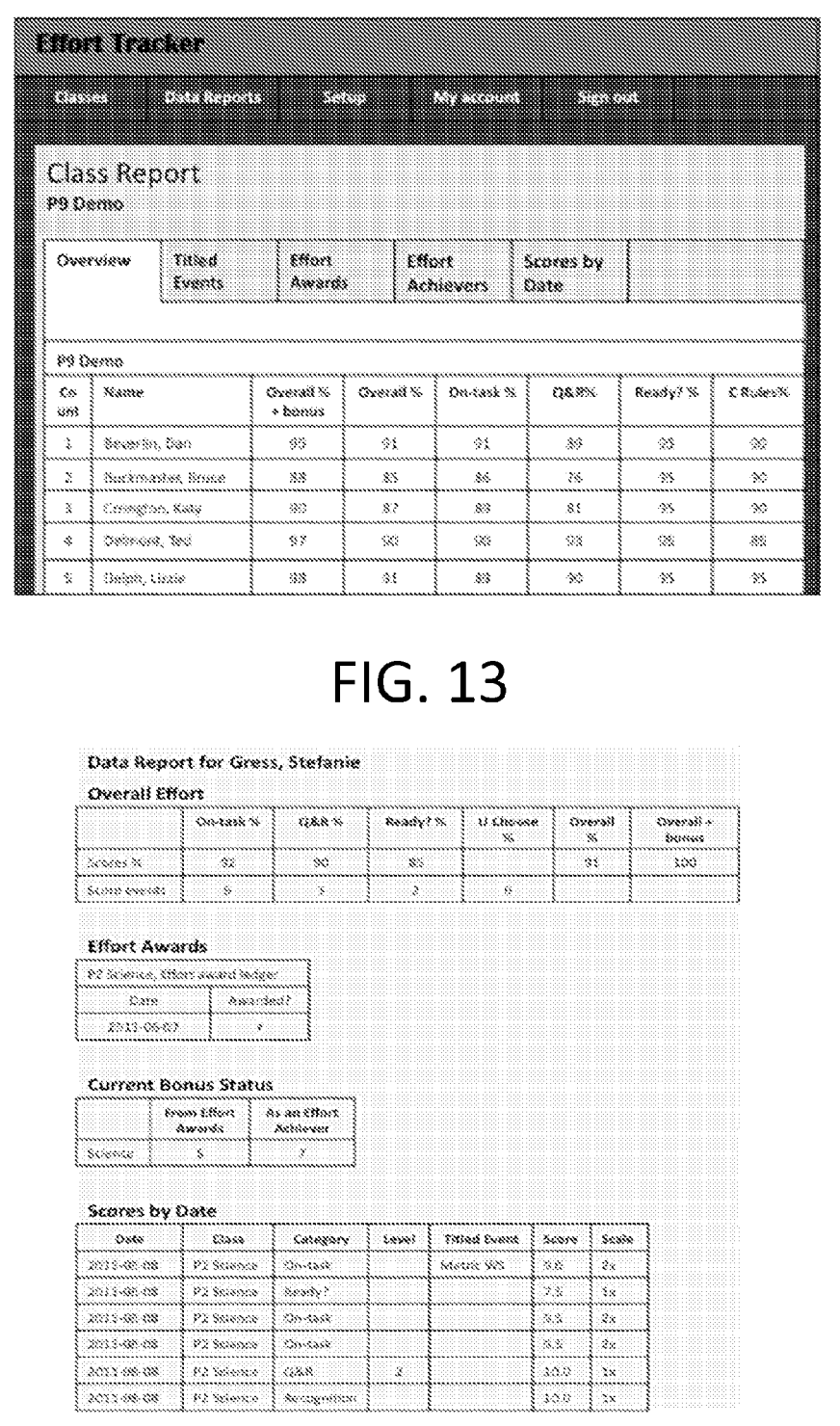

Referring to FIG. 13, the Overview tab provides a table which shows the current student averages in each of the four effort categories (On task, Q&R, Ready?, and U Choose). The teacher can utilize the Overall % or Overall %+bonus for the effort portion of the student's grade in the teacher's electronic gradebook. Teachers can also choose to include some of their Titled events directly into their grade book. For example, an "effort" category can be created in the grade book and assigned a weight (e.g. 20%) to represent the percentage that the effort data will factor into the student's overall grade. Then the effort data can be entered into the "effort" field in the grade book.

The teacher can review and change the scores of any individual student by clicking on the student's name. This may be done from any of the Data Reports' tables. FIG. 14 shows a sample student report. This is an example of the type of report the student or parent would see after entering the student's access code at the designated website for student/parent access.

The student report comprises four sections: (1a) Overall Effort (averages scores in all Effort Categories to give an average Overall % for the current Time Period) which may be displayed in table form alone or with comparisons against the overall average of all students in a class and/or with the student's average scores from other Time Periods; (1b) the system of 1a only using a graphical representation to show the change in student's by-category and/or Overall % scoring over time; (1c) representation of Overall Effort by both table and graph as described in 1a and 1b; (2) Effort Award Ledger (shows the dates for which the student was up for an Effort Award and whether or not it was given (Y=Yes, N=No)); (3) Current Bonus Status (shows the student's current bonus total from the Effort Award and Effort Achiever categories); and (4) Scores by Date (lists effort scores from most recent to oldest. This is one location where a change of a student's score can be made. Score changes may be saved by using an "save" button or saved automatically without needing to actuate a save button).

Selecting the edit tab allows the teacher to edit the student's name and remove or add students from/to a class or subject.

Assigning a title to a student assignment or activity is available in the On-Task, category by choosing the "new" button (see FIG. 6). Teachers can choose to assign a Title to a learning activity when they plan to score all students and want to be able to trace scoring to a particular learning event or activity. Titled Events appear by order of when they were created. Scores are editable from this table, see FIG. 15.

The Effort Awards table (FIG. 16) allows the teacher to review the award and bonus status of a class or individual student. If an error needs to be corrected, it may be corrected directly at this table or by clicking on the student's name to open their individual editable record. Effort award bonus points can be calculated as follows: a student receives the maximum of 5 bonus points if he or she earns an Effort Award every time they are eligible (their name is selected by the highlighter at the top of the Recognition category list). All scoring and bonus points start over each time the teacher begins a new time period.

In the example of FIG. 16, Carl earns 6 of 6 possible Effort Awards so he receives the maximum bonus of 5. Julie earns 5 of 6 Effort Awards so her bonus=5÷6×5=4.17, rounded to the nearest whole number=4. Andy earns 3 of 5, Effort Awards so his bonus=3÷5×5=3. Andy has not had his turn yet for round six of Recognition.

Figures 17, 18:
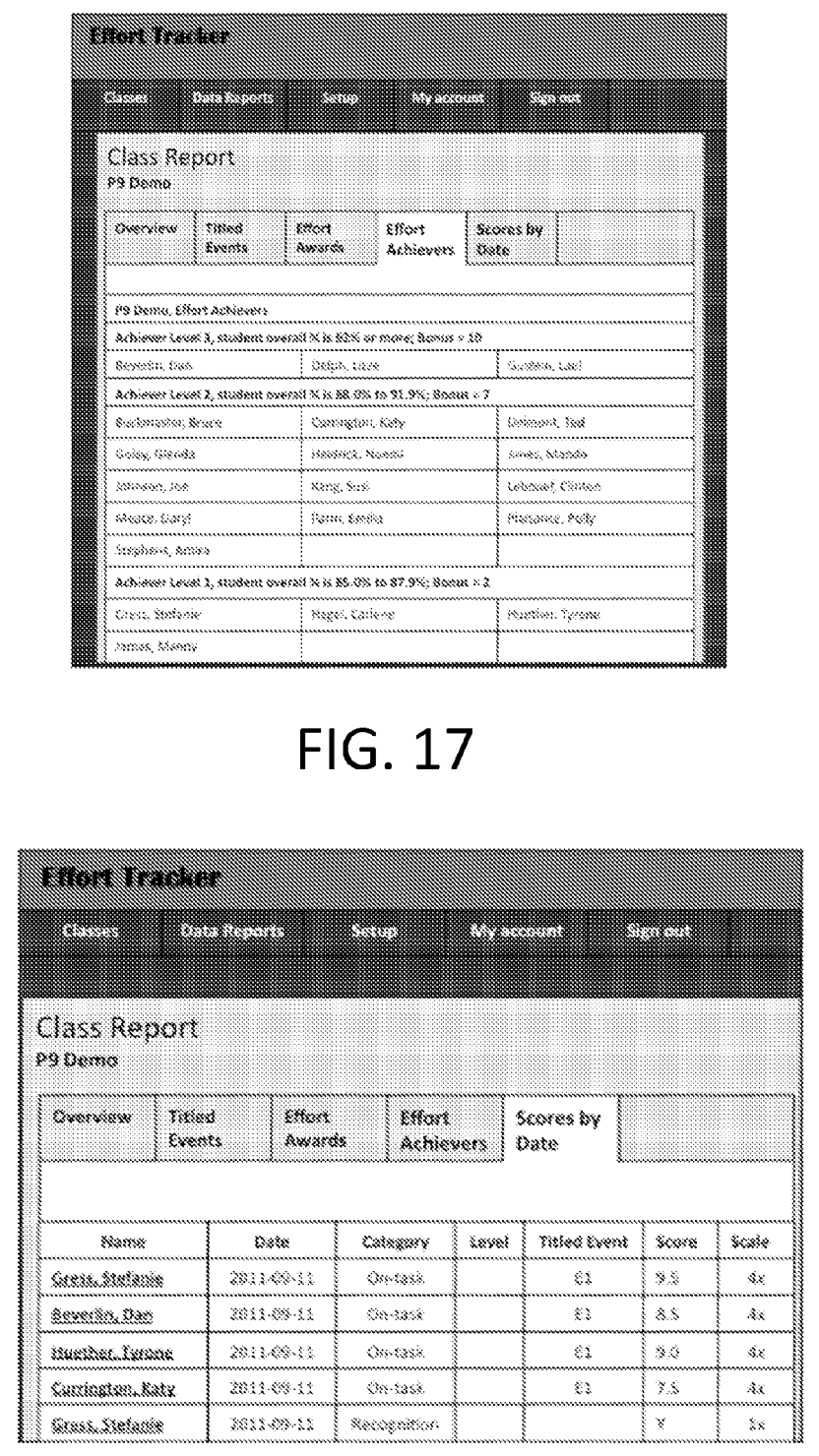

The Effort Achievers table in FIG. 17 lists sample students whose overall percentage falls within the range of one of 3 Achiever Levels as well as how many bonus points each level is worth. The user may customize Effort Achiever bonus by assigning the score ranges and bonus amounts for each Achiever Level.

The Scores by date table (FIG. 18) allows for ease of score changes for several students from the same class. For changes to an individual student, click on his or her name. FIG. 18 shows column headings and sample data. The Score column is used to make changes. Data is entered into the Scores by date table based on when (date and time) it was saved—the most recent saves appear at the top.

Figures 19, 20:
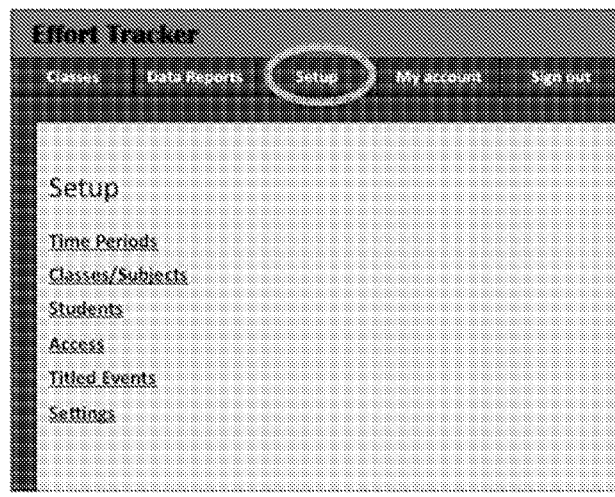
FIG. 19 is an example graphic interface screen illustrating certain aspects of certain embodiments of the invention.
FIG. 20 is an example graphic interface screen illustrating certain aspects of certain embodiments of the invention.

Setup of the database parameters will now be described, starting with reference to FIG. 19. The first Time Period is named by the teacher when they first sign up for an Effort Tracker account. The user will subsequently want to begin new Time Periods whenever they wish to remove all scores (e.g. at the start of a new quarter). This may be accomplished by going to Setup/Time periods and selecting the "New Time Period" button. When creating a new Time period, the teacher may choose to bring along previously-created classes/subjects so that the teacher will not have to reenter class and/or student names.

The Classes/Subjects option in the setup menu provides for creating a new class/subject or editing an existing one.

The students option provides for adding students to one or more of the classes, or moving a student from one class to another. As shown in FIG. 20, the user can select the tab of the class to be edited, or the "all classes" tab can be selected.

The access menu provides a list of student access codes. Each student and parent uses the particular student's and/or parents' assigned access code in order to view the effort data that is updated in real-time. The access codes may be manually or automatically emailed or otherwise sent to the students and parents or other authorized person. Alternatively, the system can send an email with an invitation link to register for access. An access code can be sent to each person being invited to further securitize the registrations.

The titled events menu provides for editing of the previous titled events or creation of a new event.

Figure 21:
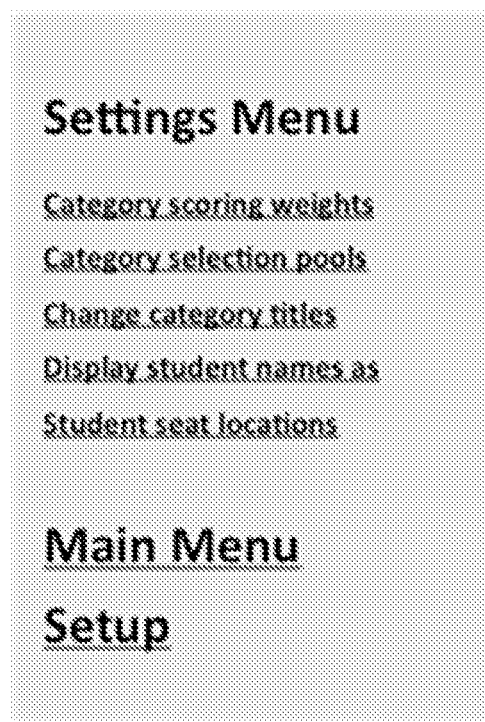
FIG. 21 is an example graphic interface screen illustrating certain aspects of certain embodiments of the invention.

Now the setup/settings menu items will be discussed with reference to FIG. 21. First, with regard to "category selection pools" the teacher can choose between a normal or expanded student list (pool) for each category. Under normal pool all students are listed once. When generating the student list under an expanded pool, 25% of the students will be listed twice and the rest will be listed once. Some teachers may prefer an expanded pool for the Q&R category, for example, so that students are less likely to become complacent after being called on.

Regarding the "category scoring weights" option, category weights may be adjusted so that some categories have a greater impact on students' Overall percentage. Default category weights can be, for example: On-task 50%, Q&R 40%, Ready? 10%, U Choose 0%. The sum of all categories must be 100 or an error notice will be issued to the user.

Regarding "change category titles" option, two categories, U Choose and/or "Ready?" may be renamed to more accurately represent the users preferences. Additional features and functions can be customized by the user without departing from the scope of the invention.

Regarding the "display student names as" option, the user can select from the following options for displaying names: First L, First, Last, Last F, and Last, First.

Regarding the "scorepad values" option, the score value choices displayed on the user interface for scoring can be adjusted (207 of FIG. 2).

Regarding the "student seat locations" option, it is helpful to assign a number code next to the student's name to help the teacher locate the student when their name is highlighted during Q&R and other categories. Also, seat location numbers are needed if the user desires to perform scoring by seat location instead of by name or random.

The invention has been described herein with regard to evaluating student effort. However, the invention is applicable to other environments where effort is desirably tracked, without departing from the scope of the invention. For example, the invention can be applied to employee evaluation, and also to environments where training is being performed.

As noted above, the system or method in certain embodiments may be stored in the form of an executable program on a computer recordable medium. The medium may take any form as is known to those of skill in the art. In one embodiment, the program is stored in the memory of a handheld smart phone, thereby providing the device with the features and functionality described herein. It is contemplated, however that a general purpose or special purpose computing device may also be used within the scope of the invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An effort scoring system, comprising:
   a software code stored on tangible media and executing on a first internet-connected computer
   a user interactive computer comprising a graphical user interface and data input device, the user-interactive computer being connected to the internet,
   wherein the user interactive computer is configured to receive data from the first internet-connected computer, including an identity of a particular student to be evaluated for effort, a current category in which effort is to be evaluated, and a plurality of effort score options selectable by an evaluator,
   wherein the user-interactive computer is configured to display on the graphical user interface the identity of the particular student to be evaluated for effort, the current category in which effort is to be evaluated, at least one of a skip option and an absence option to skip effort scoring for the particular student to be evaluated for effort, and the plurality of effort score options,
   wherein the user-interactive computer is configured to register a selection by the evaluator of one of the plurality of effort score options, the skip option and the absence option with the input device and transmit the selection information to the first internet-connected computer, and
   wherein the user-interactive computer is configured to determine whether the particular student is eligible for recognition by calculating an average effort score for a plurality of effort scores starting with the chronologically most recent and extending backwards in time and comparing the average effort score to a minimum recognition threshold score.

2. The system of claim 1, wherein the graphical user interface and input device both comprise a touch-responsive display screen.

3. The system of claim 1, wherein the user-interactive computer is further configured to add a bonus to an overall effort score for the particular student that is determined to be eligible for recognition in response to a user input.

4. The system of claim 1, wherein the effort scoring system scores participation effort for the particular student.

* * * * *